(12) United States Patent
Borisenko et al.

(10) Patent No.: US 9,490,682 B2
(45) Date of Patent: Nov. 8, 2016

(54) METHOD AND SYSTEM FOR ALTERNATOR THERMAL PROTECTION

(71) Applicant: General Electric Company, Schenectady, NY (US)

(72) Inventors: Maksim V. Borisenko, Waterford, PA (US); Edward Thomas Petrak, Erie, PA (US); Roy David Schultz, Erie, PA (US); Rajeev Verma, Bangalore (IN); Sunil Srinivasa Murthy, Bangalore (IN)

(73) Assignee: General Electric Company, Schenectady, NY (US)

( * ) Notice: Subject to any disclaimer, the term of this patent is extended or adjusted under 35 U.S.C. 154(b) by 36 days.

(21) Appl. No.: 14/404,835

(22) PCT Filed: May 31, 2013

(86) PCT No.: PCT/US2013/043669
§ 371 (c)(1),
(2) Date: Dec. 1, 2014

(87) PCT Pub. No.: WO2013/181570
PCT Pub. Date: Dec. 5, 2013

(65) Prior Publication Data
US 2015/0145255 A1    May 28, 2015

Related U.S. Application Data

(60) Provisional application No. 61/654,318, filed on Jun. 1, 2012.

(51) Int. Cl.
*H02P 11/00*     (2006.01)
*H02H 7/06*     (2006.01)
(Continued)

(52) U.S. Cl.
CPC ............... *H02K 9/04* (2013.01); *B60L 11/02* (2013.01); *H02P 29/0044* (2013.01); *H02P 29/0072* (2013.01)

(58) Field of Classification Search
USPC ..................................... 322/33; 318/400.33
See application file for complete search history.

(56) References Cited

U.S. PATENT DOCUMENTS 5,298,842 A    3/1994  Vanek et al.
6,982,545 B2 *  1/2006  Browning .............. H02H 5/044
                                                            322/28

(Continued)

FOREIGN PATENT DOCUMENTS

EP    1965489 A1   9/2008
EP    2058941 A1   5/2009
JP    2009072016 A 4/2009

OTHER PUBLICATIONS

Colebrook, "Turbulent Flow in Pipes, with Particular Reference to the Transition Region Between the Smooth and Rough Pipe Laws", Journal of the Institution of Civil Engineers, vol. No. 11, pp. 133, Feb. 1, 1938.

(Continued)

*Primary Examiner* — Pedro J Cuevas
(74) *Attorney, Agent, or Firm* — GE Global Patent Operation

(57) ABSTRACT

A system (for controlling cooling of an alternator) comprises a control system, an alternator, and a blower fan, the alternator having a stator and a rotor. The control system is adapted to estimate one or more temperatures of the stator and/or rotor of the alternator using a thermal model. The control system is also adapted to control the blower fan to cool the alternator by providing a specified amount of air flow across the stator and rotor of the alternator, based on the estimated one or more temperatures of the stator and/or rotor.

24 Claims, 10 Drawing Sheets

(51) Int. Cl.
*H02P 9/00* (2006.01)
*H02K 9/04* (2006.01)
*H02P 29/00* (2016.01)
*B60L 11/02* (2006.01)
*H02P 1/04* (2006.01)

(56) References Cited

U.S. PATENT DOCUMENTS

| | | | | |
|---|---|---|---|---|
| 7,288,922 | B2* | 10/2007 | Maehara | H02H 6/005 |
| | | | | 290/40 C |
| 7,535,116 | B2* | 5/2009 | Daigle | B60L 11/123 |
| | | | | 290/40 A |
| 7,999,432 | B2* | 8/2011 | Ichiyama | H02K 11/048 |
| | | | | 310/114 |
| 8,179,084 | B2 | 5/2012 | Kumar et al. | |
| 8,482,238 | B2* | 7/2013 | Xie | B60W 20/00 |
| | | | | 318/461 |
| 9,203,339 | B2* | 12/2015 | Sato | H02P 27/08 |
| 2005/0258807 | A1 | 11/2005 | Yanagi | |
| 2006/0238172 | A1* | 10/2006 | Maehara | H02H 6/005 |
| | | | | 322/33 |
| 2008/0252182 | A1* | 10/2008 | Daigle | B60L 11/123 |
| | | | | 310/75 R |
| 2009/0045765 | A1* | 2/2009 | Ichiyama | H02K 21/028 |
| | | | | 318/538 |
| 2011/0279074 | A1 | 11/2011 | Yeh et al. | |
| 2012/0133313 | A1* | 5/2012 | Xie | B60W 20/00 |
| | | | | 318/473 |
| 2014/0001999 | A1* | 1/2014 | Sato | H02P 27/08 |
| | | | | 318/503 |
| 2015/0381090 | A1* | 12/2015 | Henderson | H02P 21/13 |
| | | | | 318/400.33 |
| 2015/0381091 | A1* | 12/2015 | Henderson | H02P 21/13 |
| | | | | 318/400.33 |
| 2016/0069624 | A1* | 3/2016 | Rollins | F04D 25/028 |
| | | | | 415/122.1 |
| 2016/0076946 | A1* | 3/2016 | Jaros | G01K 7/36 |
| | | | | 374/45 |

OTHER PUBLICATIONS

Robinson et al., "Surface Heat Transfer Coefficients of Salient Poles in a Blast Cooled Alternator", Transactions of the AIEE, vol. No. 76, Issue No. 4, pp. 199-204, Sep. 1957.

Carew, "Flow Distribution and Pressure Drop in Salient Pole Electrical Machines", Proceedings of the Institution of Mechanical Engineers, vol. No. 184, pp. 62-67, 1969.

Perez et al., "A Stationary Thermal Model for Smooth Air Gap Rotating Electrical Machines", Electric Machines and Electromechanics, vol. No. 3, pp. 285-303, 1979.

Mellor et al., "Real Time Prediction of Temperature in an Induction Motor Using Microprocessor", Electric Machines & Power Systems, vol. No. 15, Issue No. 4-5, pp. 333-352, 1988.

Mellor et al., "Lumped Parameter Thermal Model for Electrical Machines of TEFC Design", Electric Power Applications, IEE Proceedings B, vol. No. 138, Issue No. 5, pp. 205-218, 1991.

Winterton "Where did the Dittus and Boelter Equation come from?", International Journal of Heat and Mass Transfer, vol. No. 41, Issue No. 4-5, pp. 809-810, 1998.

Zocholl et al., "Using Thermal Limit Curves to Define Thermal Models of Induction Motors", 28th Annual Western Protective Relay Conference, vol. No. 3, Issue No. 1, pp. 23-25, 2001.

PCT Search Report and Written Opinion issued in connection with corresponding PCT Application No. PCT/US2013/043669 on May 30, 2014.

\* cited by examiner

200

1000

METHOD AND SYSTEM FOR ALTERNATOR THERMAL PROTECTION

This application is a National Stage of International Application No. PCT/US13/043669, filed May 31, 2013, which claims priority to U.S. Provisional Application Ser. No. 61/654,318, filed Jun. 1, 2012, hereby incorporated by reference herein.

BACKGROUND

1. Field

Embodiments of the invention relate to power electronics systems including alternators. Other embodiments relate to temperature control of alternators.

2. Discussion of Art

Alternators may be used in a power conversion system to provide power to an off-highway vehicle. An off-highway vehicle may be a vehicle that is not for use on roads designated for primary use by automobiles, and may include one or more engines or motors for energy generation and propulsion. Examples of off-highway vehicles include locomotives and other rail vehicles, marine vessels, mining haul trucks, other heavy mining or construction equipment, and the like.

During operation, the temperature of the alternator may change depending on the load placed on the alternator. A blower is used to project air across the components of an alternator in order to maintain a suitable operating temperature. In some cooling operations, the operation of the blower is based on the alternator revolutions per minute (RPM). Additionally, in some cooling operations, the blower operates at full capacity, sending a large amount of air across the alternator, regardless of the actual temperature of the alternator. As a result, the blower can be overused, resulting in an unsuitable use of energy. Furthermore, operating the blower at full capacity results in high blower operation costs when compared to the actual standard cubic feet per minute (SCFM) of air that can maintain a suitable operating temperature for the alternator.

BRIEF DESCRIPTION

Briefly, in accordance with an embodiment of the invention, a system includes an alternator, a control system, and a blower fan. The alternator has a stator and a rotor. The control system is adapted to estimate one or more temperatures of the stator and/or rotor of the alternator using a thermal model. The control system is adapted to control the blower fan to cool the alternator by providing a specified amount of air flow across the stator and/or rotor of the alternator based on the one or more temperatures that are estimated. In another embodiment, the system may be part of a vehicle (e.g., an off-highway vehicle). For example, the alternator may be an alternator of the vehicle, and the control system may be adapted to control a blower fan of the vehicle based on the one or more temperatures, to cool the alternator of the vehicle.

Embodiments also include a method of cooling an alternator. For example, in an embodiment, a method comprises estimating (e.g., by a control system) one or more temperatures of at least one of a stator or a rotor of an alternator using a thermal model, and controlling (e.g., by the control system) a blower fan to cool the alternator by providing a specified amount of air flow across at least one of the stator or rotor of the alternator based on the one or more temperatures that are estimated.

In another embodiment of a method, steady state temperature equations of the alternator are derived using a controller, wherein the controller models the alternator as a thermal network that includes nodes. Thermal resistances are calculated using heat coefficients and an air flow distribution within the alternator. Losses of the alternator are determined, and nodal temperatures within a stator and a rotor of the alternator are determined using the steady state temperature equations, thermal resistances, and losses of the alternator. Cooling of the alternator is controlled (e.g., a blower fan is controlled) based at least in part on the nodal temperatures.

DRAWINGS

These and other features, aspects, and advantages of the invention will become better understood when the following detailed description is read with reference to the accompanying drawings in which like characters represent like parts throughout the drawings, wherein.

DETAILED DESCRIPTION

Figure 1:
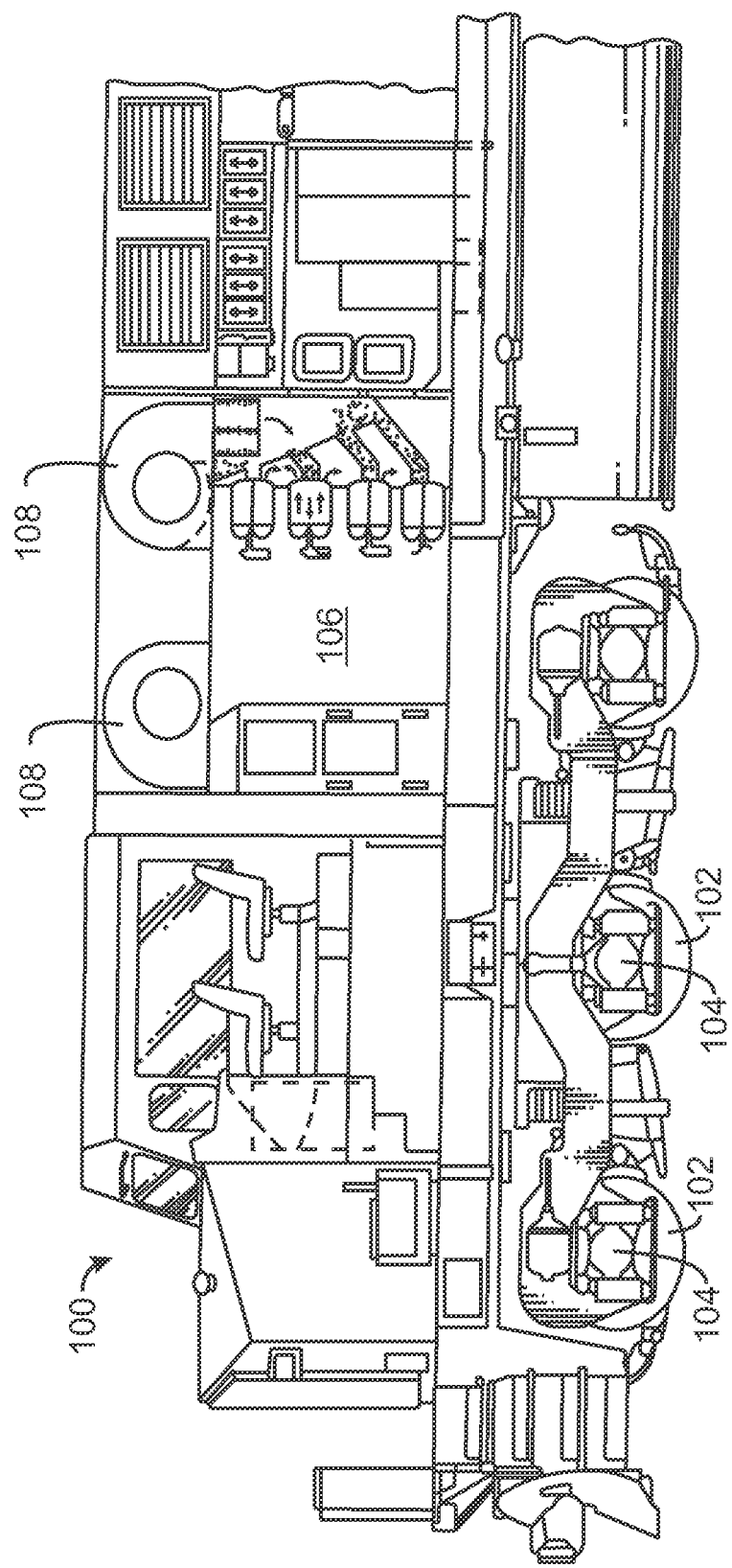
FIG. 1 is a block diagram of a diesel-electric locomotive in accordance with embodiments.

Off-highway vehicles, such as trains, may be pulled or pushed by one or several locomotives. Power conversion systems (e.g., systems for converting one form of power to another, such as converting mechanical power to electrical power) used in a locomotive may reside within the limits of the locomotive body. Alternatively, trains may be propelled by multiple, smaller power conversion systems placed along the train. Both types of power conversion systems have several advantages and disadvantages, while also incorporating different design challenges. For ease of description, power conversion systems are described as residing within the confined space of a locomotive body or other vehicle. However, a person having ordinary skill in the art will be able to use this description in other forms of propulsion. Furthermore, while the techniques presented are described with respect to a locomotive, the presented techniques may be used in other off-highway vehicles and other vehicles more generally. Further, embodiments of the invention are applicable in the context of a distributed power rail vehicle consist, where multiple spaced-apart locomotives (or other propulsion generating vehicles) are controlled for coordinated motoring/traction. For example, plural of the locomotives or other propulsion generating vehicles in the consist could be outfitted with respective alternator cooling control systems as set forth herein (e.g., with independent thermal models), for cooling alternators of the vehicles.

Embodiments of the invention generally relate to modeling an alternator within a power conversion system to estimate temperatures within the alternator. Cooling of the alternator may be based on the estimated temperatures. For example, a control system may be configured to use the model to derive an air flow request for a blower fan based on the estimated temperatures. The blower fan is controlled based on the air flow request so that the alternator temperatures are maintained at a desired temperature. In embodiments, the air flow request may be a request for an amount of air in standard cubic feet per minute (SCFM) to be sent to a blower unit comprising the blower fan and a control circuit. More generally, the air flow request may be a request for a particular mass flow rate of air, in SCFM or standard cubic meters per second ($Sm^3/s$) for example. Additionally, in embodiments, the model of the alternator may be used to estimate the actual temperature of the alternator over time using temperatures at various points, or nodes, within the alternator. Further, loss calculations may be incorporated into the model of the alternator to estimate the nodal temperatures within the alternator as a function of time. In embodiments, the model provides estimated temperatures of the alternator stator and rotor using a weighted average of respective nodal temperatures. The most limiting temperature may be used to determine the blower speed in the form of an SCFM ($Sm^3/s$) air flow request. In this manner, the model may have multiple configurable set-points.

FIG. 1 is a block diagram of a diesel-electric locomotive in accordance with embodiments. The locomotive, which is shown in a simplified, partial cross-sectional view, is generally referred to by the reference number 100. A plurality of traction motors, not visible in FIG. 1, are located behind drive wheels 102 and coupled in a driving relationship to axles 104. A plurality of auxiliary motors, not visible in FIG. 1, are located in various locations on the locomotive, and coupled with various auxiliary loads such as blowers or radiator fans. The auxiliary motors may be alternating current (AC) electric motors.

Further, although not visible in FIG. 1, the diesel-electric locomotive includes a diesel engine that provides the power to move the locomotive. The engine includes a drive shaft that drives other components within the locomotive. In embodiments, the drive shaft is used to provide mechanical power to an alternator, which may reside within an equipment compartment 106. When mechanical power is provided to the alternator, the alternator generates AC electricity that can be used to provide power to components such as the traction motors located behind the drive wheels 102. In embodiments, the alternator may also be used to provide AC electricity to peripheral components, such as lighting, climate control, and control panels used by operators to operate the locomotive. Further, in embodiments, a primary alternator provides electricity to the traction motors, while a secondary alternator provides electricity to the peripheral components. However, in variable speed (VSPD) applications, instead of a secondary alternator, auxiliary inverters may power peripheral components directly from a rectified DC link from the main traction alternator. For ease of description, the present techniques are described using a single alternator as shown in FIGS. 4-7. However, any number of alternators may be used.

An alternator generates alternating current by changing a magnetic field that surrounds a conductor, using electromagnetic induction to produce the current. The alternator includes two main portions, an armature and a field magnet. The armature, or conductor, is typically stationary and is known as the stator. The stator includes stationary coils that are wound around a core, which may be made of iron. In embodiments, the field magnet moves to vary a magnetic field across the stator, and is known as a rotor. The rotor is magnetized and moves by rotating within a space surrounded by the stator. The space surrounded by the stator may be referred to as an interpolar space. Additionally, the rotor may have brushes and slip-rings to enable external direct current (DC) field excitation. In this manner, DC field excitation may be coupled to the rotor coils in order to establish magnetic poles while allowing free rotor rotation. When the mechanical input from the drive shaft causes the rotor to rotate, the magnetic field produced by the rotor changes across the conducting coils of the stator, creating an alternating current within the coils of the stator.

An alternator can be a salient pole alternator or a non-salient pole alternator. In salient pole alternators, the rotor includes poles that "stick out" from the center of rotation, creating a non-uniform air gap between the rotor and the stator. Conversely, in a non-salient pole alternator, the poles do not stick out from the surface of the alternator, thereby creating a uniform air gap between the rotor and the stator.

In embodiments, the alternator is a three phase alternator. A three-phase alternator is used to provide a three phase signal that can be rectified to a DC signal. In a three-phase alternator, a stator is used that has three single-phase windings that are spaced evenly around the rotor. Each single-phase winding is independent of the other two single-phase windings. The spacing of the windings allows the AC signal that is created by any one phase to be displaced by one-hundred twenty degrees from the remaining two phases. Each of the three displaced signals may be rectified to produce a DC signal.

Referring again to FIG. 1, the locomotive 100 may include air intakes 108 positioned throughout locomotive 100 to allow air flow through the equipment compartment 106 in order to maintain a suitable operating temperature of components within the equipment compartment 106. The equipment compartment may include a blower unit (not shown in this figure) that draws air at an ambient temperature from the air intakes 108 and directs the air across components within the equipment compartment 106, such as the alternator.

Figure 2:
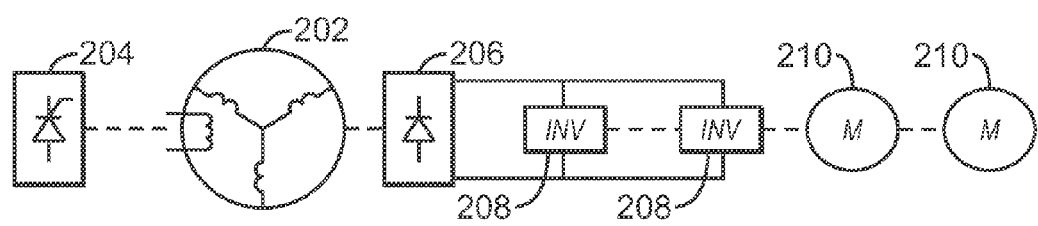
FIG. 2 is a block diagram of a power conversion system in accordance with embodiments.

FIG. 2 is a block diagram of a power conversion system in accordance with embodiments. The power conversion system, which is generally referred to by the reference number 200, may be used to control AC power to a load, such as one or more motors in the locomotive 100 (FIG. 1) or other vehicle. The power conversion system 200 may include an alternator 202 driven by an on-board internal combustion engine, such as a diesel engine (not shown). The power output of the alternator 202 is regulated by a field excitation control indicated by a field control 204. Electrical power from the alternator 202 is rectified by a rectifier 206 to a DC signal, and coupled to one or more inverters 208. The inverters 208 may use high power semiconductor switches to convert the DC signal to an AC signal with variable frequency and variable voltage amplitude for application to one or more AC motors 210. Although two motors are shown, the locomotive or other vehicle may include any number of AC electric motors.

Figure 3A:
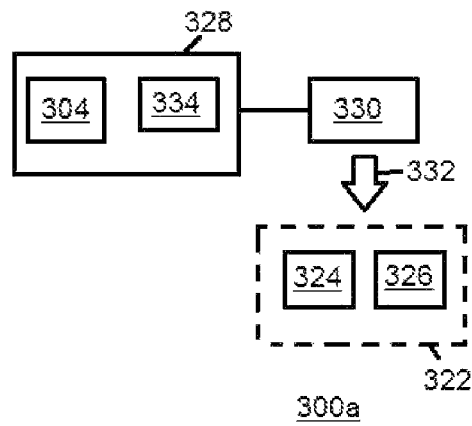
FIGS. 3A and 3B are block diagrams of systems that estimate alternator temperatures, in accordance with embodiments.

FIG. 3A is a block diagram of an embodiment of a system 300a, e.g., a system for controlling alternator cooling. The system comprises an alternator 322 having a stator 324 and a rotor 326. The system further comprises a control system 328 that is adapted to estimate one or more temperatures 334 of the stator and/or rotor of the alternator using a thermal model 304. The system further comprises a blower fan 330. ("Blower fan" refers to any device that can be electrically controlled and powered to generate a variable air flow for cooling purposes; thus, a blower fan may include a motor and an impeller, fan blades, or the like.) The control system is adapted to control the blower fan to cool the alternator by providing a specified amount of air flow 332 across the stator and rotor of the alternator based on the one or more temperatures 334 that are estimated. In embodiments, the control system is integrated together with the blower fan as a blower unit. In such an embodiment, the blower unit is adapted to estimate the one or more temperatures, and to control the blower fan based on the one or more temperatures. In other embodiments, the control system is distributed between several separate elements, such that a first portion of the control system is integrated with the blower fan as a blower unit, and another, second portion of the control system is separate from the blower unit. For example, the second portion may be a vehicle controller. In such an embodiment, for example, the second portion of the control system may be adapted to estimate the one or more temperatures using the thermal model, and the first portion of the control system may be adapted to control the blower fan based on the one more estimated temperatures that are received from the second portion. In other embodiments, the control system is completely separate from the blower unit, with the blower unit comprising only a blower fan and (in some embodiments) electrical components for running the blower fan based on voltage control signal inputs. Whether any given implementation utilizes a control system that is fully integrated with a blower fan in a blower unit, a distributed control system, or a control system that is completely separate from a blower unit may depend on available components and computing resources. For example, it may be the case that an existing vehicle controller provides sufficient computing resources for implementing the control system, thereby reducing the costs of the blower unit since the blower unit will not need its own computation functionality.

Figure 3B:
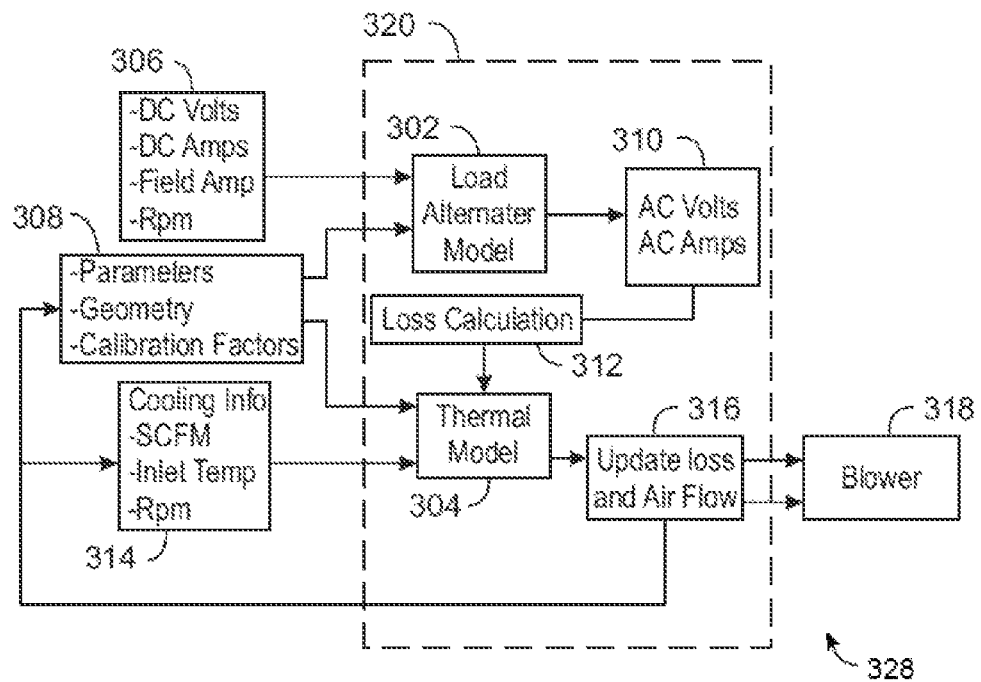

FIG. 3B is a block diagram of a system 300b that estimates alternator temperatures for cooling control purposes, in accordance with embodiments. The system 300b comprises a control system 328, which includes an electronic device 320 such as a computer, application specific integrated circuit, or a field programmable gate array. The electronic device 320 includes a load alternator model 302 and a thermal model 304. The load alternator model 302 models the load placed on the alternator and has inputs 306 and 308. The inputs 306 are inputs to the load alternator model 302. The inputs 306 are derived from information on the load carried by the locomotive or other vehicle, and include the DC volts, DC amps, field amps, and the revolutions per minute (RPM) of the engine. The DC volts and DC amps represent the total DC volts and DC amps used to operate the load, while the field amps represent the DC excitation current supplied to the alternator rotor. In embodiments, the inputs 306 may also include the engine speed as well as the link power of the entire load. The inputs 306 may be based on actual operating conditions of the alternator. For example, the alternator may use, as input, a particular amount of DC volts, DC amps, field amps, and the revolutions per minute (RPM) of the engine to drive the load.

The inputs 308 include machine parameters, geometry of the alternator, and calibration factors. The machine parameters may include thermal parameters, such as thermal resistances and thermal capacitances, which are imported into in the thermal model 304. The machine parameters may also include calibration constants. The machine parameters may also include the heat transfer coefficients. In embodiments, the engine speed is included in the inputs 308.

The load alternator model 302 receives the inputs 306 and 308 and computes AC volts, and AC amps at reference number 310. The outputs at reference number 310 may be used to derive the loss calculations 312 of the alternator. The loss calculations 312 represent the energy loss at points within the alternator. The loss calculations 312, along with the inputs 308 and cooling information 314, are used as inputs into the thermal model 304. The thermal model is used to model a thermal network within the alternator and compute the temperatures of the alternator stator and rotor, the loss of the alternator, and the efficiency of the alternator. The thermal model 304 can update the losses that occur within the alternator at reference number 316. The alternator thermal model can also update the SCFM ($Sm^3/s$) of air that is used to maintain a suitable operating temperature of the alternator by generating an air flow request. The updated losses may be used to update the inputs 308, while the updated SCFM ($Sm^3/s$) may be used to update the cooling information 314. In this manner, the load alternator model 302 and the thermal model 304 can receive updated alternator calculations and both the load alternator model 302 and the thermal model 304 can be revised for the new alternator operating conditions. The updated SCFM ($Sm^3/s$) at reference number 316 may also be sent to a blower unit 318 as an air flow request. The blower unit may change the current SCFM ($Sm^3/s$) being output by the blower unit to accommodate the new air flow request from the thermal model 304. In embodiments, the thermal model 304 may send the nodal temperatures of the stator and rotor to the blower unit 318, and the blower unit 318 calculates the proper SCFM ($Sm^3/s$) to maintain a desired operating temperature of the stator and rotor. In embodiments, the thermal model 304 sends a weighted average of nodal temperatures of the stator and rotor to the blower unit 318 in order for the blower unit to calculate the proper SCFM ($Sm^3/s$) to maintain a desired operating temperature of the stator and rotor. Hence, to maintain overall alternator temperatures at or below rated thermal set-points, the air flow request may be based on the most limiting alternator temperature, whether that is on the stator or rotor. (As should be appreciated, characterizations of the thermal model performing certain acts or functions are provided for ease of explanation. In a more technical sense, the electronic device or other portion of the control system is that which performs the functions, based on the logic of the thermal model.)

The thermal model 304 divides the alternator into basic thermal elements that are linked together to form a network of nodes and thermal resistances. For ease of description, the thermal model 304 is described using a particular number of nodes. However, any number of nodes can be used in the thermal model. The thermal elements include resistances and capacitances at various nodes forming a thermal network. For a thermal network system consisting of n nodes, the steady state nodal temperatures are related by $$P_i + \frac{\theta_{amb}}{R_{i,i}} = \frac{\theta_i}{R_{i,i}} + \sum_{j=1}^{n} \frac{\theta_i - \theta_j}{R_{i,j}} \quad (1)$$

where the subscripts i and j denote two nodes within the thermal network system. The heat loss at node i is represented by $P_i$. The resistance $R_{i,j}$ represents the thermal resistance between nodes i and j, and $R_{i,i}$ represents the thermal resistance between node i and the heat sink temperature. In embodiments, the heat sink may be attached to the alternator in order to dissipate heat produced by the alternator. The ambient temperature is represented by $\theta_{amb}$, while the steady state temperature $\theta$ at each node is obtained by solving the vector equation $$\theta = G^{-1} P \quad (2)$$

where P is the vector of alternator heat losses within the alternator and G is the conductance matrix, defined as $$G = \begin{bmatrix} \sum_{i=1}^{n} \frac{1}{R_{1,i}} & \frac{-1}{R_{1,2}} & \frac{-1}{R_{1,3}} & \cdots & \frac{-1}{R_{1,n}} \\ \frac{-1}{R_{2,1}} & \sum_{i=1}^{n} \frac{1}{R_{2,i}} & \frac{-1}{R_{2,3}} & \cdots & \frac{-1}{R_{2,n}} \\ \cdots & \cdots & \cdots & \cdots & \cdots \\ \frac{-1}{R_{n,1}} & \frac{-1}{R_{n,2}} & \frac{-1}{R_{n,3}} & \cdots & \sum_{i=1}^{n} \frac{1}{R_{n,i}} \end{bmatrix} \quad (3)$$

The conductance matrix G relates the conductances at each node within the thermal network system. As a result, the steady state temperature for each node within a thermal network may be found by solving for Equations 1 and 2.

Figure 4:
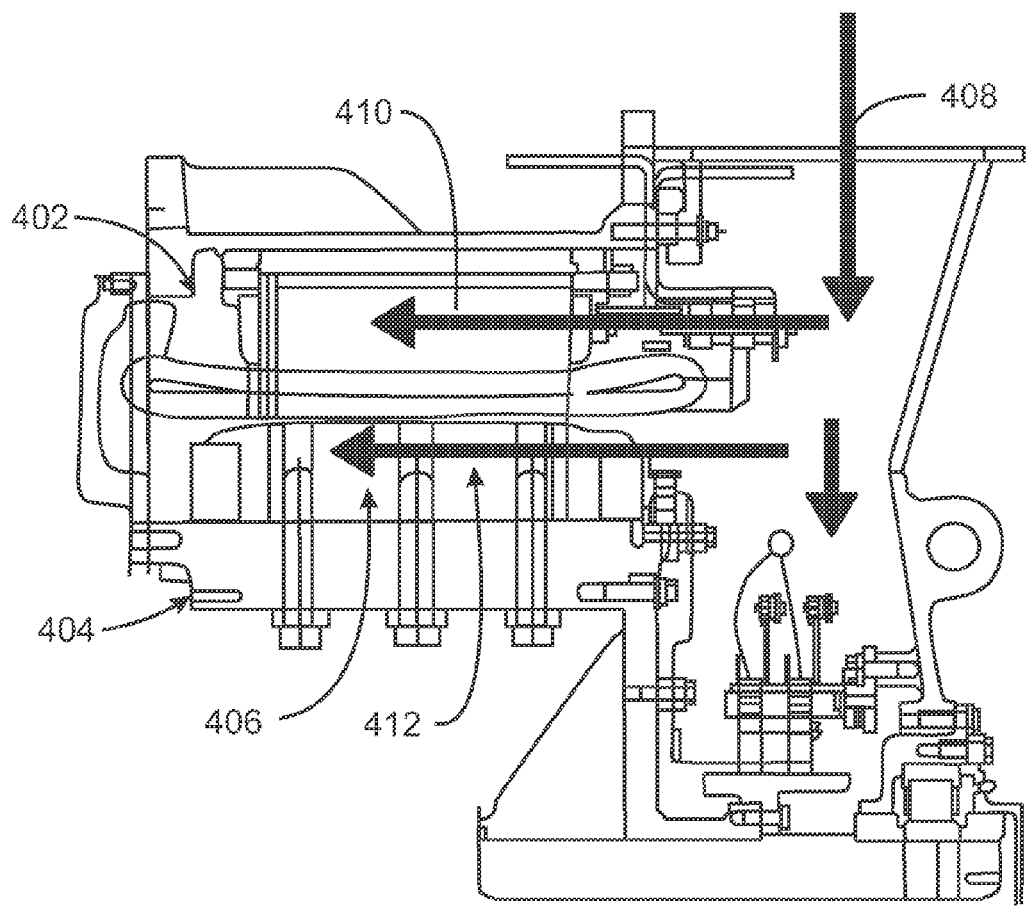
FIG. 4 is a longitudinal cross section of an alternator in accordance with embodiments.

FIG. 4 is a longitudinal cross section of an alternator 400 in accordance with embodiments. The alternator 400 includes a stator 402 and a rotor 404. The rotor 404 includes poles 406. Air flow may enter the alternator at air flow intake 408. The air flow may split and continue across the stator as indicated with the arrow at reference number 410, and also at the arrow across the rotor at reference number 412.

In embodiments, the air flow split across the stator 402 and the rotor 404 of the alternator may be determined by the geometry of the alternator. For example, the stator 402 and rotor 404 may be shaped in such a way as to direct a higher percentage of air flow from air intake 408 across the stator 403. Additionally, in embodiments, the air flow split across the stator 402 and the rotor 404 can change based on a change in the alternator geometry. Furthermore, in embodiments, the air flow split the stator 402 and the rotor 404 can be further controlled by the addition of one or more blower units positioned in a manner to control the air flow split.

Figure 5A:
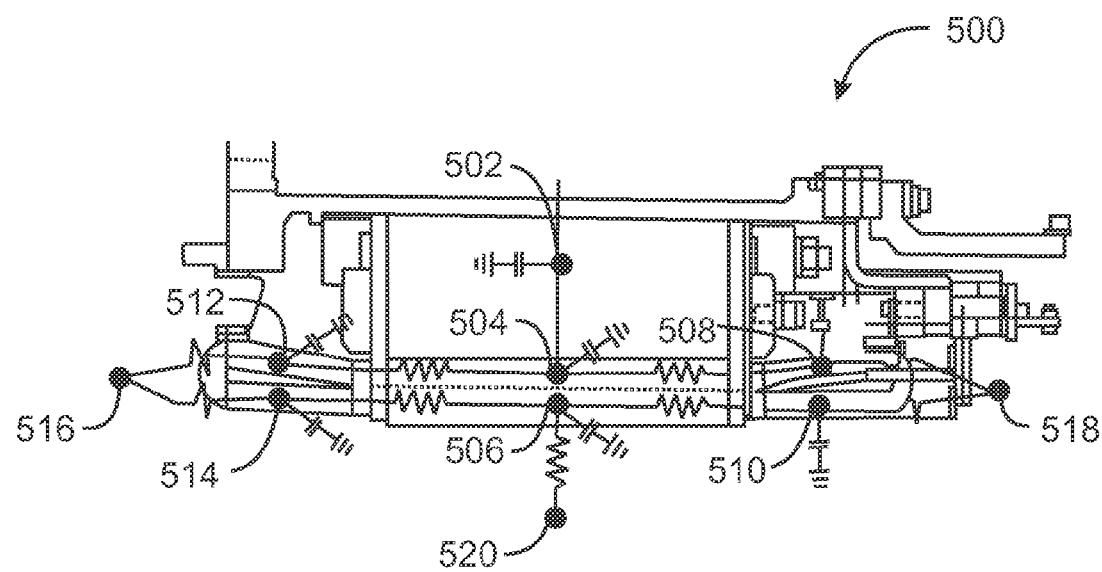
FIG. 5A is an axial view of a stator of a salient pole alternator in accordance with embodiments.

FIG. 5A is an axial view of a stator 500 of a salient pole alternator in accordance with embodiments. Although the stator model in FIG. 5A is illustrated with seven nodes, any number of nodes may be used. In the axial view of the stator 500, an axial distribution of thermal nodes in the stator 500 is illustrated. In this example, the stator has seven nodal points visible, specifically: a node 502 at the bottom stator tooth; a node 504 at the bottom stator coil; a node 506 at the top stator coil; a node 508 at the connection end of the bottom coil knuckle; a node 510 at the connection end of the top coil knuckle; a node 512 at the engine end of the bottom coil knuckle; and a node 514 at the engine end of the top coil knuckle. In embodiments, the stator, as shown in FIG. 5A, is a per slot stator model. The air temperatures at the two ends of the stator are modeled through two nodes, $T_{end\_hot}$ at reference number 516, and $T_{end\_cold}$ at reference number 518. Thus, air flow may enter the stator at an ambient temperature near $T_{end\_cold}$. Air flow at a temperature higher than the air flow at $T_{end\_cold}$ may exit the stator at $T_{end\_hot}$. An additional node at reference number 520 represents the temperature of the air gap, $T_{airgap}$, between the stator and a pole of the rotor.

Figure 5B:
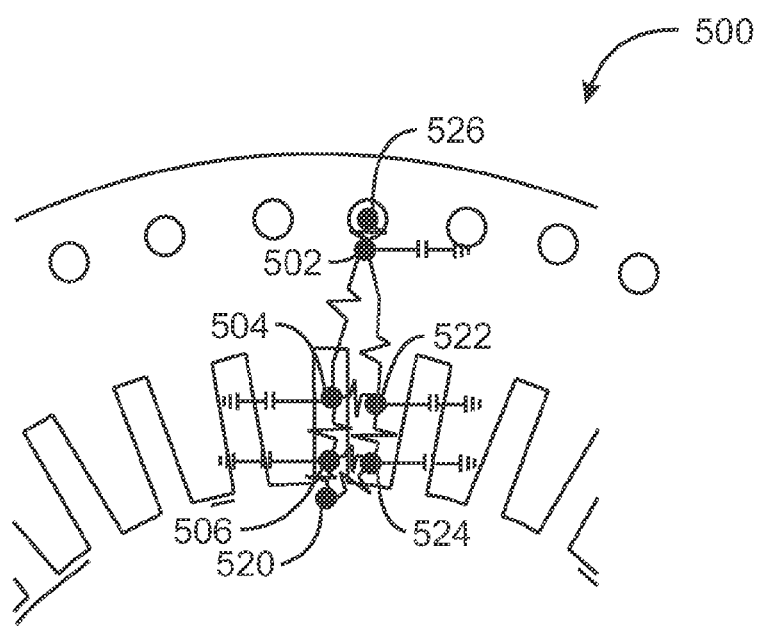
FIG. 5B is a radial view of the stator of the salient pole alternator in accordance with embodiments.

FIG. 5B is a radial view of the stator 500 of the salient pole alternator in accordance with embodiments. The stator model has five thermal nodes distributed along a center plane of the stator 500 to capture the radial heat transfer as specified by the heat coefficients. Specifically: the node 502 at the bottom stator tooth; the node 504 at the bottom stator coil; the node 506 at the top stator coil; a node 522 at the bottom stator tooth; and a node 524 at the top stator tooth. The node 520 representing the temperature of the air gap $T_{airgap}$ is also visible in FIG. 5B. The stator 500 has an additional node at reference number 526 that represents the temperature of the air within the stator 500 ventilation ducts, $T_{airslot}$. The slots of the stator provide support to the encased windings.

Figure 6A:
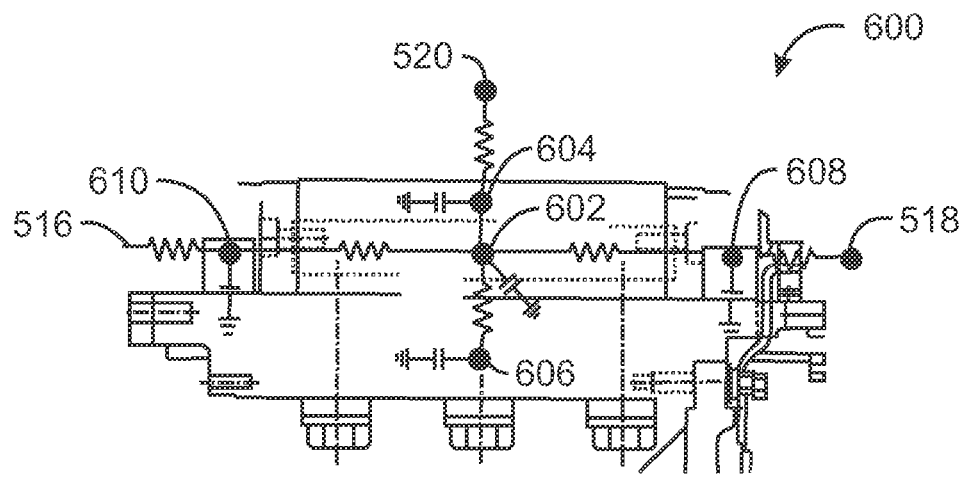
FIG. 6A is an axial view of a rotor of a salient pole alternator in accordance with embodiments.

FIG. 6A is an axial view of a rotor 600 of a salient pole alternator in accordance with embodiments. The axial view of the rotor 600 shows an axial distribution of thermal nodes in the rotor 600. For the sake of simplicity, only a thermal network of a single pole of the rotor 600 is shown. However, it will be appreciated that the rotor 600 may have a plurality of poles, including two or more poles, for example. In the axial view of the rotor 600, the rotor 600 has five nodal points visible, specifically: a node 602 at the rotor pole body; a node 604 at the top of the rotor pole; a node 608 at the connection end of the rotor end winding; and a node 610 at the non-connection end of the rotor end winding. Additionally, a node 606 may be implemented at the rotor yoke. In embodiments, the node 606 may be an additional node to the model. The end winding temperatures $T_{end\_hot}$ and $T_{end\_cold}$ at reference numbers 516 and 518, respectively, are also present at the rotor 600. The temperature of the air gap, $T_{airgap}$, is also present in the rotor at reference number 520.

Figure 6B:
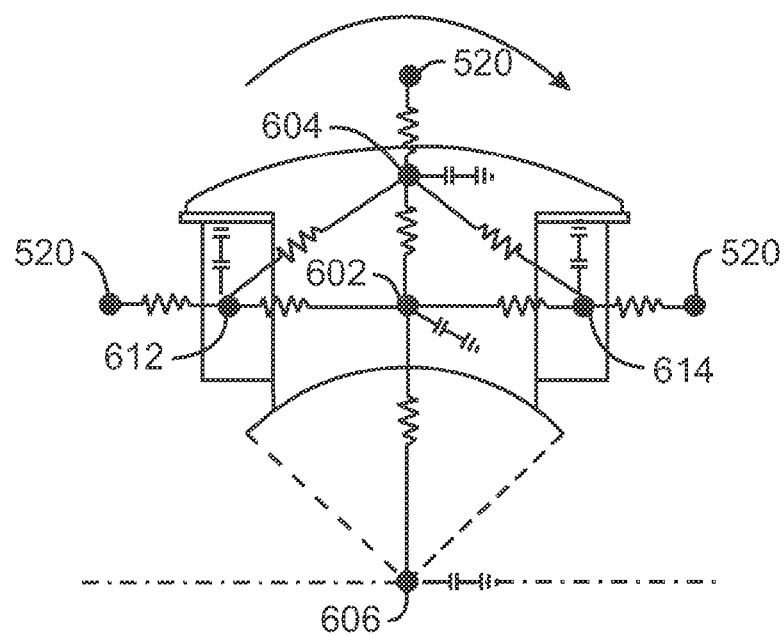
FIG. 6B is a radial view of the rotor of the salient pole alternator in accordance with embodiments.

FIG. 6B is a radial view of the rotor 600 of the salient pole alternator in accordance with embodiments. The rotor model has four thermal nodes distributed in the radial directions, specifically: the node 602 at the rotor pole body; the node 604 at the top of the rotor pole; a node 612 at the rotor end winding; and a node 614 at the opposite rotor end winding. Accordingly, FIG. 6B includes two additional thermal nodes used for capturing the rotor end winding temperatures. Capacitances may be assigned to each node in order to account for thermal storage during alternator operation.

Thus, the stator model 500 has twelve nodes 502, 504, 506, 508, 510, 512, 514, 516, 518, 520, 522, and 524, while the rotor model 600 has seven nodes 602, 604, 606, 608, 610, 612, and 614, for a total of nineteen nodal points in the thermal network throughout the alternator. As discussed above with regard to FIGS. 5A and 5B, the stator nodes provide temperatures throughout the stator. Specifically: node 502 provides the temperature of the stator core; nodes 504 and 506 provide the temperature of the stator winding in the core region; nodes 522 and 524 provide the temperature of the tooth region of the stator; nodes 508 and 510 provide the temperature of the stator cold end windings; and nodes 512 and 514 provide the temperature of the stator hot end winding. The rotor nodes provide temperatures of the rotor as follows: node 602 provides the temperature of the rotor pole body; node 612 provides the temperature of the trailing edge of the rotor winding; node 614 provides the temperature of the leading edge of the rotor winding; node 604 provides the temperature of the rotor pole face; node 608 provides the temperature at the hot end of the rotor winding; and node 610 provides the temperature at the cold end of the rotor winding. Although the stator and rotor are shown with a specific number of nodes, any amount of nodes can be used at any locations throughout the model of the alternator. As a result, the stator and rotor can have any number of nodes.

The thermal impedances that branch the nodes in a thermal network can be broadly classified under conduction and convection resistances, with radiation neglected. Further, the thermal model can use a cylindrical component for obtaining the thermal impedances, or the thermal resistances can be derived from a basic rectangular geometry. The conductive impedances the thermal model may be based on the one-dimensional thermal resistance between two points, and is given by $$R_{th} = \frac{1}{k}\int_0^L \frac{dx}{A} \tag{4}$$

where k is the material thermal conductivity, A is the cross-sectional area through which heat flows and L is the distance between the points for which the thermal resistance is calculated. For a rectangular geometry, Eqn. 4 reduces to $$R_{th} = \frac{1}{k}\int_0^L \frac{dx}{A} = \frac{1}{kA}[x]_0^L = \frac{L}{kA} \tag{4a}$$

and for a cylindrical geometry, the thermal resistance simplifies to $$R_{th} = \frac{1}{k}\int_0^L \frac{dx}{A} = \frac{1}{k \cdot b}\int_{r1}^{r2} \frac{dr}{2\pi r} = \frac{1}{2\pi k \cdot b}[\ln r]_{r1}^{r2} = \frac{1}{2\pi k \cdot b}\ln\left[\frac{r2}{r1}\right] \tag{4b}$$

The convective heat transfer between the exposed surfaces of the stator and rotor and the cooling air is modeled by convective resistance $R_c$, and is calculated as, $$R_c = \frac{1}{hA} \tag{5}$$

where A is the surface area in contact with the cooling air and h is the boundary film coefficient. The heat transfer coefficient, h, depends on many variables, such as the shape and dimensions of the surface, flow characteristics and material characteristics of the fluid. Numerical values of h are in general determined from empirical relations of the Nusselt number. The Nusselt number is a dimensionless number and is directly related to the heat transfer coefficient by $$Nu = \frac{hL}{k_f} \tag{6}$$

where L is a characteristic length and $k_f$ is the thermal conductivity of the cooling air. The Nusselt number is usually expressed as a function of the Reynolds number and the Prandtl number. The Reynolds number is used in fluid dynamics to characterize the flow of fluids, while the Prandtl number represents a ration of momentum diffusivity. The dimensionless Reynolds (Re) and Prandtl (Pr) numbers are given as, $$Re = \frac{\rho v L}{\mu} \tag{7}$$

$$Pr = \frac{\mu c_p}{k} \tag{8}$$

where $\rho$ is the fluid density, $\mu$ is the fluid dynamic viscosity, k is the fluid thermal conductivity, v is the velocity of coolant flow and L is the characteristic length. The heat transfer coefficients are used to calculate the convective resistances $R_c$ within the thermal network of the thermal model 304.

The first heat transfer coefficient describes the convective heat transfer between the stator or rotor vent ducts and the cooling air. This heat transfer coefficient may be calculated using the Dittus-Boelter equation for fully developed (hydro-dynamically and thermally) turbulent flow in a smooth circular tube. The Dittus-Boelter equation includes both the Reynolds number and the Prandtl number, and is given as $$Nu_D = 0.023 Re^{0.8} Pr^{0.4} \tag{9}$$

where the subscript D denotes the internal diameter of the smooth circular tube.

The second heat transfer coefficient describes the convective heat transfer between the stator or rotor and an air-gap. The air gaps occur between the stator and a pole of the rotor. The air gap heat transfer coefficient is calculated based on the correlation similar to that of laminar flow over a flat plate and is of the form $$Nu_D = 0.0692 Re^{0.8} Pr^{0.33} \tag{10}$$

The Reynolds number in Eq. 10 is based on the velocity of air in the air gap region of the salient pole alternator. The air gap velocity is taken to be the root mean square of the axial flow of the cooling air and the tangential flow created by the rotor.

The third heat transfer coefficient describes the convective heat transfer between the stator end windings and end-cap air. The correlation described in Eq. 10 is also used to calculate this heat transfer coefficient from the outside nodes of the end winding to the cooling air. In embodiments, the heat transfer coefficient is the same as the heat transfer between the stator end windings and end cap air. The velocity used in the Reynolds number calculation is obtained from the stator vent duct flow rate.

The fourth heat transfer coefficient describes an average of the convective heat transfer between a pole face of the rotor and the air gap. The average heat transfer coefficient of the pole face is correlated with the tangential and axial air flows as:

$$h_{pf} = 5.86(V_t \rho)^{0.65} + 5.2\left(\frac{V_t}{V_a}\right)^{-0.376} \tag{11}$$

where $V_t$ is the tangential air velocity and $V_a$ is the axial air velocity in the annular approach to the rotating configuration. An additional fifth heat transfer coefficient may be found to describe the convective heat transfer between field windings of the rotor. The field winding heat transfer coefficient is calculated as the root mean square of the heat transfer caused by axial flow of cooling air in the interpolar region and the tangential cooling caused by rotor rotation.

In addition to the heat transfer coefficients, the air flow distribution within the alternator is used to calculate the convective resistances $R_c$ within the thermal network of the thermal model 304. Air flow distribution is a measure of the amount of air flowing through the entire power conversion system, as well as the amounts of air that flow across each of the stator and rotor of the alternator. In embodiments, alternators are axially cooled with air flow entering at one end of the alternator and exiting the other end, while passing through the stator vent ducts and rotor interpolar space of the alternator. The flow distribution between the stator and rotor is predicted based on an air flow network model of the system. The pressure drop across the stator vent ducts can be expressed as a function of the mean flow velocity through $$\Delta p = \frac{1}{2}(C + f_d)\rho v^2 \quad (12)$$

where C is the loss coefficient, $f_d$ is the Darcy friction factor and v is the flow velocity. The entrance loss for flow through sharp-edged holes in a rotor is given as, $$C = 1.8 + \frac{[-0.039 + C_1(u/v) + C_2(u/v)^2 + C_3(u/v)^3]}{[1 + D_1(u/v) + D_2(u/v)^2 + D_3(u/v)^3]} \quad (13)$$

where $C_1=0.0604$, $C_2=-0.00549$, $C_3=0.0001631$, $D_1=-0.143$, $D_2=0.00765$ and $D_3=0.0000592$. The velocities u and v represent the duct flow and the axial velocity of the rotating hub respectively. The axial velocity u of the rotating hub is zero for the stator and is calculated as a product of the angular velocity $\omega$ and the radius of the vent duct hole r for the rotor. The Darcy friction factor for turbulent flow is calculated as $$\frac{1}{\sqrt{f}} = -2.0 * \log\left(\frac{E/DH}{3.7} + \frac{2.51}{Re\sqrt{f}}\right) \quad (14)$$

where (E/DH) represents the relative roughness of the vent duct surface. A turbulent flow generally occurs when the Reynolds number is greater than 3000, or Re>3000 is true. In embodiments, the stator vent ducts and rotor interpolar space provide equivalent parallel paths for air flow. Hence, the pressure drop $\Delta p$ across the stator and rotor is equal. The thermal model iteratively varies the flow through the stator vent duct and rotor interpolar space till the pressure drop is equalized across the stator vent duct and rotor interpolar space. In this manner, the air flow through the alternator can be determined. Furthermore, when the heat transfer coefficients and the air flow through the alternator have been determined, the convective resistances for the nodes within the thermal network can be calculated and used to form a steady state thermal network within the thermal model 304.

Figure 7:
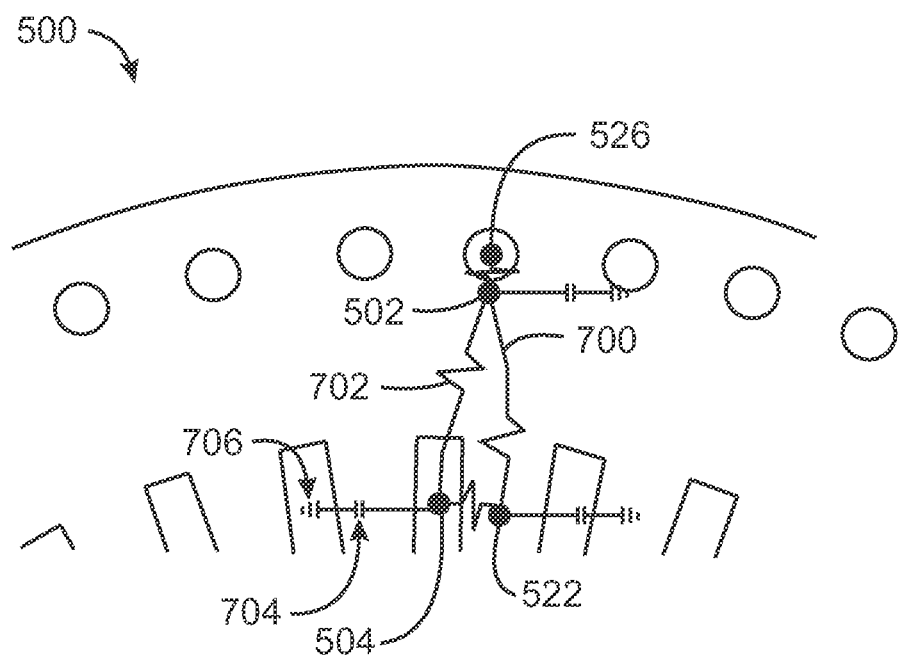
FIG. 7 is a thermal network of the stator in accordance with embodiments.

FIG. 7 is a thermal network 700 of the stator 500 in accordance with embodiments. Using the steady state thermal network formed by the both the steady state nodes and their connecting resistances, a transient thermal network as a function of time can be determined. An energy balance equation for node 502 can be written as:

$$\frac{T_1 - T_{airslot}}{R_1} + \frac{T_1 - T_2}{R_{12}} + \frac{T_1 - T_3}{R_{13}} + C_1 \frac{dT_1}{dt} = \text{Power} \quad (15)$$

In Eqn. 15, T represents the nodal temperatures, R the resistance between the nodes and C the thermal capacitance of the nodes. Power is the total power across each node at a particular time. Further, node 1 is located at reference number 502, node 2 is located at reference number 504, and node 3 is at reference number 522. On rearrangement and grouping of like terms, Eqn. 15 can now be written as:

$$\left(\frac{1}{R_1} + \frac{1}{R_{12}} + \frac{1}{R_{13}}\right)T_1 - \frac{1}{R_{12}}T_2 - \\ \frac{1}{R_{13}}T_3 - \frac{1}{R_1}T_{airslot} + C_1\frac{dT_1}{dt} = \text{Power} \quad (16)$$

In a similar manner, if the equations of each of the 15 nodes of the thermal network are put in a matrix form, the result is:

$$[R][T] + [C]\frac{d[T]}{dt} = [Q] \quad (17)$$

Eqn. 17 can be re written as, $$\frac{d[\theta]}{dt} = [A][\theta] + [H] \quad (18)$$

where, $[A]=-[C]^{-1}[R]$ and $[H]=[C]^{-1}[Q]$. In embodiments, Q can be viewed as the power (thermal transfer) nodal network represented in matrix form at a given instant. Heat flows between nodes in matrix Q, based on temperature and impedances, thus simulating heat transfer. The variable $\theta$ is substituted for temperature, T, as the variable t is already used in the differential operator for time. Eqn. 17 is a system of linear differential equations whose solution may be obtained by using eigenvalue techniques. Let $\lambda$ and X be the eigenvalues and corresponding eigenvectors of [A]. If:

$$[\vec{\theta}] = [X][\vec{Z}] \quad (19)$$

Eqn. 18 becomes:

$$\frac{d[Z]}{dt} = [\lambda][Z] + [r] \quad (20)$$

where $[\lambda]=[X]^{-1}[A][X]$ and $[r]=[X]^{-1}[H]$.

The characteristic solution for this system is given as:

$$Z_i = e^{\lambda_i t}\left(\int e^{-\lambda_i t} r(t)dt + c_i\right) = -\frac{r_1}{\lambda_i} + c_i e^{\lambda_i t} \quad (21)$$

Since for a given loading condition, the losses are independent of time, r(t) remains constant and hence can be taken out of the integral. An integration constant, $c_i$, can be found from the initial conditions. Furthermore, since the losses are independent of time, the loss calculations may be done once, as in block 312, and used as an input into the thermal model 304 (FIGS. 3A-3B). The losses may occur due to various design constraints of the alternator, and should be analyzed when determining the temperatures within the alternator. The losses include copper loss, core loss, friction and windage loss, no-load core loss, and short circuit core loss.

The calculated losses can be modeled as source terms within the thermal network of the thermal model 304 (FIGS. 3A-3B). For example, referring again to FIG. 7, between the node 502 and the node 504, there is a resistance 702. Additionally, there is a capacitance between each node and the ground, such as the capacitance 704 between node 504 and ground 706. As heat leaves the network through the ground 706 as a loss through node 504, there may be heat injected into node 504 as it travels to the ground 706. The heat injected into node 504 is treated as a source term. The source terms in the thermal network resulting from the loss calculations are similar to a voltage source applied between the ground 706 and the node 504, with the ground being at the ambient temperature.

The nodal temperatures can be obtained by back substitution in Eqn. 19. In this manner, an equation for the nodal temperatures is obtained as a function of time, which can be used to predict the thermal behavior of the alternator at any time. Since the conductive heat transfer coefficients depend on the air flow rate, while the heat energy generated depends on the operating voltage and current, Equations 15-21 may be generated for any number of operating conditions and stored in the control system, e.g., in the electronic device 320 (FIG. 3B). In embodiments, the control system may derive Equations 15-21 when there is a change in operating conditions such as air flow rate and the heat energy generated. Additionally, in embodiments, a blower unit may include a controller (or other control circuitry) that can derive Equations 15-21 when there is a change in operating conditions.

Figure 8:
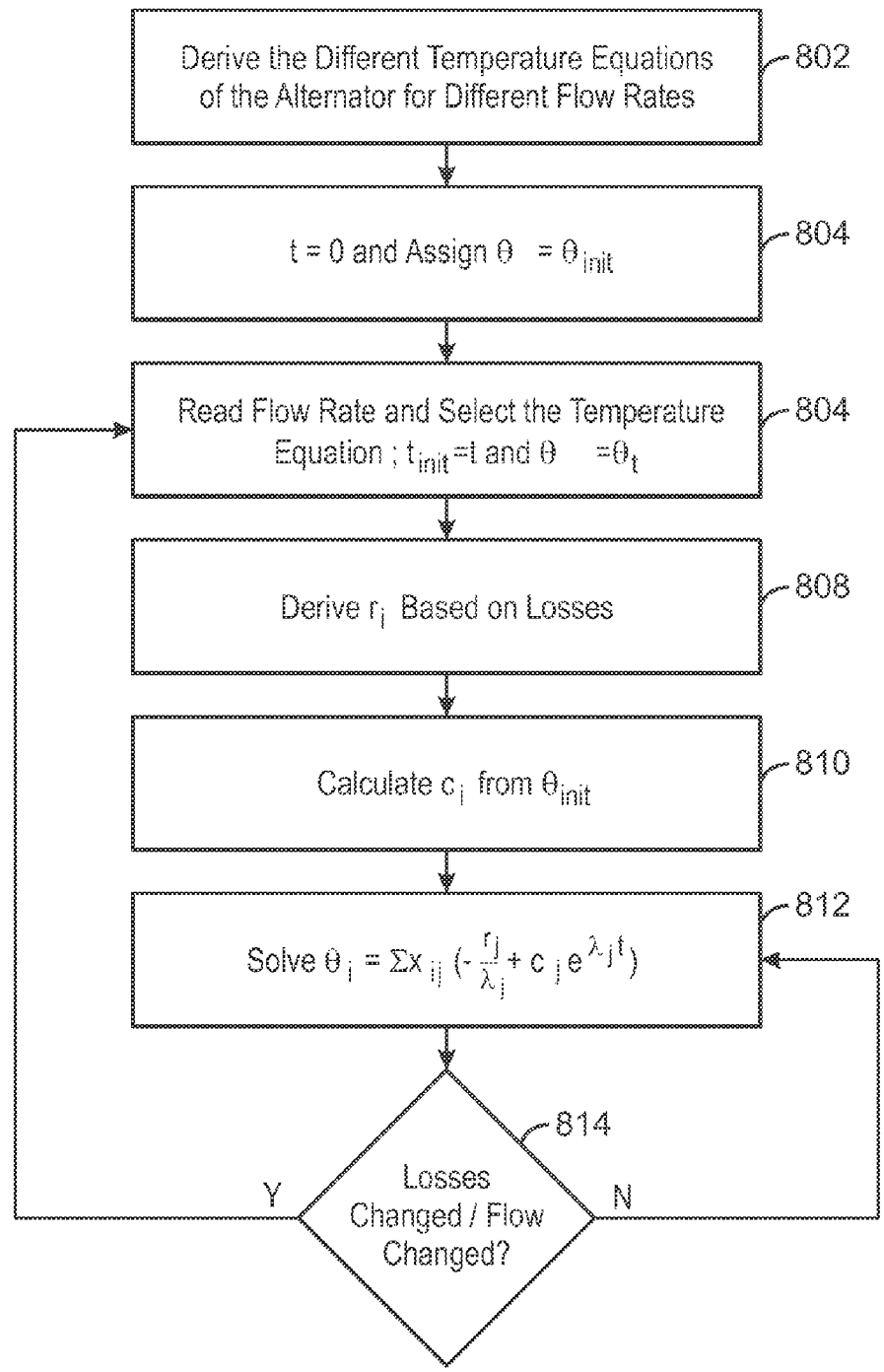
FIG. 8 is a flow diagram of a method to derive equations to determine nodal temperatures based on changed operating conditions in accordance with embodiments.

FIG. 8 is a flow diagram of a method to derive equations to determine nodal temperatures based on changed operating conditions, to control cooling of an alternator, in accordance with embodiments. At block 802, the steady state temperature equations of the alternator are derived for different flow rates. The steady state temperature equations may be pre-determined by the control system, such as the electronic device 320 (FIG. 3B), or by a blower unit including a controller. Furthermore, the steady state equations may be derived using Equations 1-4, as described above. At block 804, the transient model is initialized by setting t=0 and $\theta_t = \theta_{init}$, where t represents time and $\theta_t$ is the vector of nodal temperatures at time t. At block 806, the flow rate is determined and the corresponding temperature equation is selected. The values in the equations may be set, such as setting $t_{init} = t$ and $\theta_{init} = \theta_t$. At block 808, the resistance $r_i$ can be derived based on the losses calculated by the temperature equations. At block 810, an integration constant, $c_i$, can be found from initial conditions $\theta_{init}$. At block 812, the nodal temperatures can be obtained by back substitution in Eq. 19, which may be represented mathematically as:

$$\theta_i = \sum x_{ij} \left( -\frac{r_j}{\lambda_j} + c_j e^{\lambda_j t} \right) \quad (22)$$

Thus, Eq. 22 describes mathematically performing back substitution for each individual theta.

At block 814, if the losses or air flow has changed, process flow returns to block 806 in order to derive a new set of steady state equations for determining nodal temperatures. If the losses or air flow have not changed, process flow returns to block 812 to use the same set of equations to determine nodal temperatures. In this manner, the thermal network becomes transient, allowing the model to capture changes in the losses and air flow rate over time. The nodal temperatures can be updated in real time as a result of the transient model. Once the nodal temperatures have been calculated, a blower fan may be controlled based on the nodal temperatures, e.g., a request for a change in air flow may be sent to the blower unit based on the nodal temperatures. The air flow request may be based on the highest nodal temperature or a specified nodal temperature. Furthermore, the air flow request may be based on an average nodal temperature.

Figure 9:
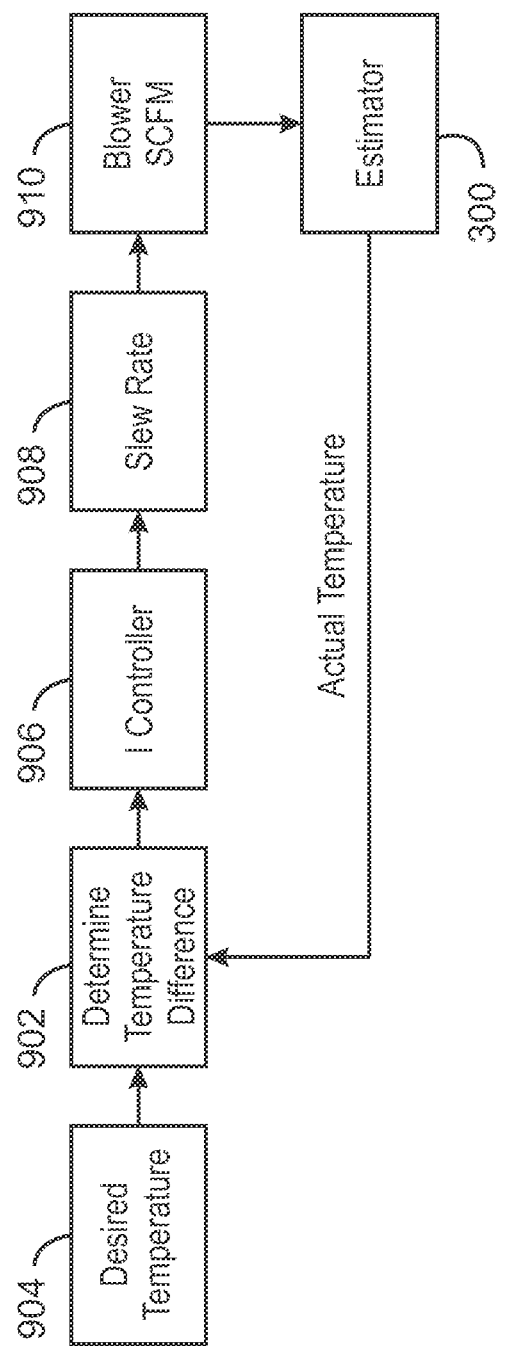
FIG. 9 is a flow diagram that issues blower speed requests in accordance with embodiments.

FIG. 9 is a flow diagram of operation of a control system that issues blower speed requests, in accordance with embodiments. At block 300, the control system may estimate alternator temperatures in accordance with embodiments discussed with regard to FIGS. 3A-3B. Block 300 may send the temperature to block 902 as input. A desired temperature at block 904 is also input to block 902. The desired temperature may be pre-determined or found in a lookup table based on various vehicle conditions.

At block 902, the difference of the temperatures input into block 902 is determined. Thus, the maximum of the actual temperature and the desired temperature is found. At block 906, the control system generates the air flow request based on the temperature difference found at block 902. The air flow request may be in terms of a mass flow rate, e.g., standard cubic feet per minute (SCFM) or standard cubic meters per second ($Sm^3/s$), and may be referred to as an SCFM ($Sm^3/s$) request. The control system calculations and air flow split are both dependent upon the geometry of the alternator. At block 908, a slew rate may be applied to the process flow, such that the blower air flow request generated at block 906 is delayed. A time delay in implementing the new blower air flow request allows the model calculations to stabilize before changing the blower settings, thereby reducing undesired blower cycling due to possible noise at a model input.

Figure 10:
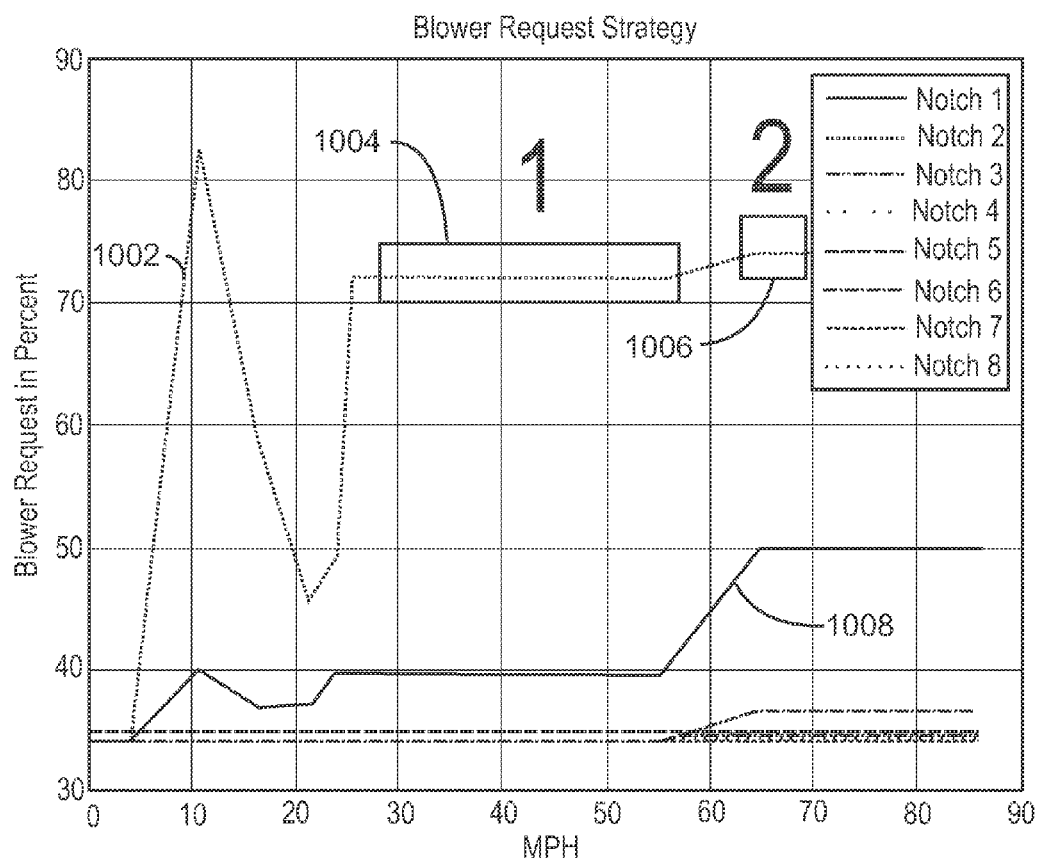
FIG. 10 is a chart showing test results in accordance with embodiments.

FIG. 10 is a chart 1000 showing test results in accordance with embodiments. Locomotives, such as the locomotive 100 (FIG. 1) are typically controlled with notched throttles. When the throttle is set at various notches, the engine provides a particular amount of power based on the notches selected. In the test case, eight notches were tested on the throttle. Notch 1 represents the lowest amount of power expended by the locomotive, while notch 8 represents the highest amount of power expended by the locomotive.

Chart 1000 compares the blower request, in percent of full capacity, at various for each notch level. For example, at reference number 1002, a dotted line is shown that represents the blower request as the speed of the locomotive increases in miles per hour operating at notch 8. At notch 8, the engine of the locomotive is working at 995 revolutions per minute (RPM). Further, the voltage output from the alternator at notch 8 is 1250 volts. Under the test conditions, a desired operating temperature of 145 degrees Celsius was maintained.

At block 1004, the locomotive is operating at notch 8, and increases in speed from about 30 MPH to 60 MPH. During this increase in speed, the blower operates at 72% of full capacity to maintain the desired operating temperature of 145 degrees Celsius. Accordingly, at block 1004, the blower is operating at less than full blower capacity and the locomotive saves energy that would otherwise be spent on causing the blower to operate at full speed. Similarly, at block 1006, the speed of the locomotive ranges from about 63 MPH to 70 MPH. As a result of the increase locomotive speed, the blower speed increases to approximately 74% of full capacity to maintain the desired operating temperature of 145 degrees Celsius.

The blower request strategy for alternator cooling at notch 8 is higher when compared to the remaining notch levels. For example, at reference number 1008, the blow request for notch 7 remains no higher than 50% in order to maintain the desired operating temperature of 145 degrees Celsius. Other notch levels shown an even greater reduction is blower request. Thus, the present techniques allow for the desired operating temperature to be maintained with a blower request strategy that does not operate the blower at full capacity.

In an aspect, the control system may be adapted to estimate the one or more temperatures as one or more nodal temperatures within the alternator that are calculated as a function of time using the thermal model. Thus, the estimated temperatures may comprise nodal temperatures of the alternator stator and/or rotor determined from the thermal model. The thermal model estimates many nodal temperatures throughout the stator and rotor, and a weighted summation of these nodal temperatures determines the overall limiting temperature on the rotor and stator then used to regulate blower speed.

As discussed above, in embodiments of the invention, a system includes an alternator, a control system, and a blower fan. The alternator has a stator and a rotor. The control system is adapted to estimate one or more temperatures of the stator and/or rotor of the alternator using a thermal model. The control system is adapted to control the blower fan to cool the alternator by providing a specified amount of air flow across the stator and rotor of the alternator based on the one or more temperatures that are estimated. In another embodiment, the system may be part of a vehicle (e.g., an off-highway vehicle). For example, the alternator may be an alternator of the vehicle, and the control system may be adapted to control a blower fan of the vehicle based on the one or more temperatures, to cool the alternator of the vehicle.

For example, another embodiment relates to a vehicle comprising an alternator, a control system, and a blower fan. The alternator includes a stator and a rotor. The control system is adapted to estimate one or more temperatures of at least one of the stator or rotor of the alternator using a thermal model. The control system is adapted to control the blower fan to cool the alternator by providing a specified amount of air flow across at least one of the stator and/or rotor of the alternator based on the one or more temperatures that are estimated.

In another embodiment of the vehicle, the one or more temperatures that are estimated comprise plural temperatures of the stator and the rotor of the alternator.

In another embodiment of the vehicle, the thermal model of the alternator comprises plural thermal elements that are linked together to form a network of nodes and thermal resistances.

In another embodiment of the vehicle, the network includes capacitances assigned to each node, such that the capacitances account for thermal storage during operation of the alternator.

In another embodiment of the vehicle, the thermal model of the alternator comprises an air flow distribution for the stator of the alternator and another air flow distribution for the rotor of the alternator.

In another embodiment of the vehicle, the vehicle is a locomotive or other off-highway vehicle further comprising a support structure (see generally FIG. 1) and an engine. The engine, alternator, blower fan, and control system are attached to the support structure. The engine is configured to power the alternator for generating electricity for propelling the off-highway vehicle.

Although embodiments have been described herein in regards to alternator cooling, other embodiments are applicable to controlling cooling of electrical devices (such as electrical devices in a vehicle) more generally. For example, such electrical devices include traction motors, motors for running loads other than a vehicle, inverters and other power converters, and the like. Thus, according to an aspect of the invention, a system (e.g., system for controlling cooling of an electrical device) comprises an electrical device, a control system, and a blower fan. The control system is adapted to estimate one or more temperatures of the electrical device using a thermal model. The control system is adapted to control the blower fan to cool the electrical device by providing a specified amount of air flow across the electrical device based on the one or more temperatures that are estimated. As one example, in another embodiment, a system (e.g., system for controlling cooling of an electrical device) comprises an electrical motor, a control system, and a blower fan. The electrical motor comprises a stator and a rotor. The control system is adapted to estimate one or more temperatures of the stator and/or rotor using a thermal model. The control system is adapted to control the blower fan to cool the electrical motor by providing a specified amount of air flow across the stator and/or rotor based on the one or more temperatures that are estimated. In such embodiments, the motor or other electrical device would be thermally modeled similarly to as described above in regards to alternators.

Similarly, in another embodiment, a method (e.g., method for cooling an electrical device) comprises estimating one or more temperatures of an electrical device using a thermal model, and controlling a blower fan to cool the electrical device by providing a specified amount of air flow across the electrical device based on the one or more temperatures that are estimated. As one example, the method may comprise estimating one or more temperatures of at least one of a stator or a rotor of an electrical motor using a thermal model, and controlling a blower fan to cool the electrical motor by providing a specified amount of air flow across at least one of the stator or rotor of the motor based on the one or more temperatures that are estimated.

In embodiments, an electrical device to be cooled comprises plural parts that in operation of the electrical device move relative to one another (e.g., the plural parts move, with relative movement between the parts, or one or more parts are stationary with one or more other parts moving), with one or both parts contributing to heat generation of the device. (For example, alternators and motors may include stators and rotors.) The thermal model includes aspects relating to the plural parts, e.g., relating to all the plural parts, or some sub-plurality of the plural parts. Thus, in this embodiment, the one or more temperatures that are estimated and which form the basis for cooling control relate not to just one part, but to multiple parts. This includes, in embodiments, multiple respective estimated temperatures of multiple parts, multiple estimated temperatures of one part, one estimated temperature relating to multiple parts through the thermal model, etc.

As noted, in embodiments, an air flow is provided across an alternator (e.g., stator and/or rotor) or other electrical device. This includes a moving air flow interacting with the device so as to result in a transfer of heat from the device to the air, resulting in cooling of the device, e.g., the air flow passes over an external surface of the device and/or internally through the device.

In embodiments, a specified amount of air to be provided for cooling may be a determined mass flow rate of air, a determined volumetric flow rate of air, an amount of air to achieve a desired degree of cooling (as a function of volume, mass, time applied, temperature, and/or the like), or the like.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to illustrate embodiments of the invention, they are by no means limiting and are exemplary in nature. Other embodiments may be apparent upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein." Moreover, in the following claims, the terms "first," "second," "third," "upper," "lower," "bottom," "top," "up," "down," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

As used herein, an element or step recited in the singular and proceeded with the word "a" or "an" should be understood as not excluding plural of said elements or steps, unless such exclusion is explicitly stated. Furthermore, references to "one embodiment" of the invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described systems and methods, without departing from the spirit and scope of the invention herein involved, it is intended that all of the subject matter of the above description or shown in the accompanying drawings shall be interpreted merely as examples illustrating the inventive concept herein and shall not be construed as limiting the invention.

The invention claimed is:

1. A system comprising:
an alternator including a stator and a rotor; and
a blower unit, comprising:
a control system; and
a blower fan integrated together with the control system to form the blower unit, wherein the blower unit is configured to estimate one or more temperatures of at least one of the stator or rotor of the alternator using a thermal model and to control the blower fan to cool the alternator by providing a specified amount of air flow across at least one of the stator or rotor of the alternator based on the one or more temperatures that are estimated.

2. The system of claim 1, wherein the control system is configured to estimate the one or more temperatures of the at least one of the stator or rotor of the alternator using nodal temperature equations within the alternator as a function of time.

3. The system of claim 1, wherein the thermal model of the alternator comprises plural thermal elements that are linked together to form a network of nodes and thermal resistances.

4. The system of claim 1, wherein the control system is configured to generate an air flow request for controlling the blower fan based on the temperatures that are estimated, said temperatures comprising nodal temperatures within the alternator.

5. The system of claim 1, wherein source terms of the thermal model of the alternator comprise losses of the alternator.

6. The system of claim 1, wherein the alternator is a salient pole alternator.

7. A vehicle comprising:
a support structure; and
the system of claim 1 attached to the support structure.

8. The vehicle of claim 7, wherein the one or more temperatures that are estimated comprise plural temperatures of the stator and the rotor of the alternator.

9. The vehicle of claim 7, wherein the thermal model of the alternator comprises plural thermal elements that are linked together to form a network of nodes and thermal resistances.

10. The vehicle of claim 7, wherein the thermal model of the alternator comprises an air flow distribution for the stator of the alternator and another air flow distribution for the rotor of the alternator.

11. The vehicle of claim 7, wherein the vehicle is an off-highway vehicle further comprising an engine attached to the support structure, and wherein the engine is configured to power the alternator for generating electricity for propelling the off-highway vehicle.

12. The system of claim 1 wherein the control system is not a vehicle controller configured to control vehicle movement.

13. A method of cooling an alternator, comprising:
deriving steady state temperature equations of the alternator using a controller, wherein the controller models the alternator as a thermal network that includes nodes;
calculating thermal resistances using heat coefficients and an air flow distribution within the alternator;
determining losses of the alternator;
deriving nodal temperatures within a stator and a rotor of the alternator using the steady state temperature equations, thermal resistances, and losses of the alternator; and controlling cooling of the alternator based at least in part on the nodal temperatures.

14. The method of claim 13, wherein the steady state temperature equations are derived each time operating conditions of the alternator change.

15. The method of claim 13, wherein the thermal resistances are convective resistances between the nodes of the thermal network.

16. The method of claim 13, wherein the losses of the alternator are modeled in the thermal network as source terms.

17. The method of claim 13, wherein the thermal network includes capacitances assigned to each node, such that the capacitances account for thermal storage during operation of the alternator.

18. The method of claim 13, wherein the heat transfer coefficients relate to convective heat transfer from surfaces within the alternator.

19. The method of claim 13, wherein the step of controlling cooling of the alternator comprises generating an air flow request using the nodal temperatures within the stator and the rotor of the alternator.

20. The method of claim 13, further comprising:
determining an actual temperature from the nodal temperatures within the stator and the rotor of the alternator; and
comparing the actual temperature to a desired temperature for the alternator; wherein the step of controlling cooling of the alternator comprises:
generating a blower speed request to increase a blower speed when the actual temperature is higher than the desired temperature; and
generating an air flow request to decrease a blower speed when the actual temperature is lower than the desired temperature.

21. A system comprising:
an alternator including a stator and a rotor;
a control system configured to estimate one or more temperatures of at least one of the stator or rotor of the alternator using a thermal model,
wherein the control system is configured to estimate the one or more temperatures as one or more nodal temperatures within the alternator that are calculated as a function of time using the thermal model, the thermal model comprising at least one of a heat transfer coefficient between a stator and a rotor vent ducts and cooling air, a heat transfer coefficient between the stator and rotor and an air gap, a heat transfer coefficient between stator end windings and an end-cap air, a heat transfer coefficient from a pole face, or a heat transfer coefficient from a field winding; and
a blower fan, wherein the control system is configured to control the blower fan to cool the alternator by providing a specified amount of air flow across at least one of the stator or rotor of the alternator based on the one or more temperatures that are estimated.

22. A vehicle comprising:
a support structure; and
a system attached to the support structure, the system comprising:
an alternator including a stator and a rotor;
a control system configured to estimate one or more temperatures of at least one of the stator or rotor of the alternator using a thermal model,
wherein the thermal model of the alternator comprises plural thermal elements that are linked together to form a network of nodes and thermal resistances, and wherein the network includes capacitances assigned to each node, such that the capacitances account for thermal storage during operation of the alternator; and
a blower fan, wherein the control system is configured to control the blower fan to cool the alternator by providing a specified amount of air flow across at least one of the stator or rotor of the alternator based on the one or more temperatures that are estimated.

23. A method of cooling an alternator, comprising:
with a control system, estimating one or more temperatures of at least one of a stator or a rotor of an alternator using a thermal model; and
with the control system, controlling a blower fan to cool the alternator by providing a specified amount of air flow across at least one of the stator or rotor of the alternator based on the one or more temperatures that are estimated, wherein the blower fan is integrated together with the control system to form a blower unit.

24. The method of claim 23 wherein the control system is not a vehicle controller configured to control vehicle movement.

* * * * *